United States Patent
An et al.

(10) Patent No.: US 6,429,849 B1
(45) Date of Patent: Aug. 6, 2002

(54) HAPTIC FEEDBACK JOYSTICK

(75) Inventors: Bin An, Woodinville; William P. Stiles, Bothell, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/515,558

(22) Filed: Feb. 29, 2000

(51) Int. Cl.[7] .............................................. G09G 5/08
(52) U.S. Cl. .................................. 345/161; 74/471 XY
(58) Field of Search ........................ 248/179; 318/516; 341/20; 345/161, 156; 74/471 XY

(56) References Cited

U.S. PATENT DOCUMENTS

| | | | | |
|---|---|---|---|---|
| 4,721,274 A | * | 1/1988 | Erb .............................. | 248/179 |
| 5,264,768 A | * | 11/1993 | Gregory et al. ............. | 318/516 |
| 5,589,828 A | * | 12/1996 | Armstrong ................... | 341/20 |
| 5,589,854 A | | 12/1996 | Tsai ............................ | 345/161 |
| 5,643,087 A | | 7/1997 | Marcus et al. ............... | 463/38 |
| 5,706,027 A | * | 1/1998 | Hilton et al. ................ | 345/156 |
| 5,724,068 A | * | 3/1998 | Sanchez et al. ............ | 345/161 |
| 5,742,278 A | | 4/1998 | Chen et al. .................. | 345/156 |
| 6,104,382 A | * | 8/2000 | Martin et al. ............... | 345/161 |
| 6,154,198 A | * | 11/2000 | Rosenberg .................. | 345/161 |
| 6,307,486 B1 | * | 10/2001 | Takeda et al. ............... | 341/20 |

* cited by examiner

Primary Examiner—Steven Saras
Assistant Examiner—Srilakshmi K. Kumar
(74) Attorney, Agent, or Firm—Ronald M. Anderson

(57) ABSTRACT

A haptic feedback joystick provides input signals for controlling computer programs in response to a pivotal displacement of a joystick control handle about a plurality of orthogonal axes. Haptic feedback force effects are applied to the joystick control handle about "X" and "Y" axes in response to haptic feedback command signals generated by the computer program. The control handle is mounted on a control handle shaft that is pivotally coupled to a full-gimbal assembly driven by two electric motors to produce the haptic feedback force. The full-gimbal assembly includes an upper and lower gimbal operatively coupled to a corresponding electric motor. One side of each gimbal includes a support shaft mounted in a corresponding bearing a frame, while the opposite sides of each gimbal include two drive pins that couple with a sector gear. Each sector gear is rotatably mounted on the frame and is coupled to the drive shaft of a different one of the electric motors. Each of the upper and lower gimbals enable the control handle to be displaced about a respective one of said X and Y axes, while the electric motors impart a torque to the control handle about these axes in response to electrical drive currents generated by a motor controller. Potentiometers are coupled to the upper and lower gimbals to produce proportional output signals indicative of the angular displacement of the control handle about the X and Y axes. The output signals are transmitted to a computer running the software program.

28 Claims, 7 Drawing Sheets

HAPTIC FEEDBACK JOYSTICK

FIELD OF THE INVENTION

The present invention generally concerns an input and control device, and more specifically, a control handle gimbal support mechanism for use in a joystick with haptic feedback, which is employed to produce control signals for controlling machinery, computer games, and the like.

BACKGROUND OF THE INVENTION

Joysticks are typically used to provide input control signals for controlling machinery and computer application programs, such as computer games. A typical joystick includes a control handle that is pivotally rotatable relative to a base in response to input forces applied by a user who is grasping the control handle. Movement of the control handle varies an output signal usually corresponding to the angular displacement of the control handle about orthogonal "X" and "Y" axes. It should be noted that movement of the joystick control handle is sometimes referred to in terms of its motion in the direction of planar X and Y axes, rather than a rotation about these axes. The output signal from a joystick is typically input to a receiving device, such as a computer, which processes the signal for controlling hardware or a computer software program. For example, in a computer executing an aircraft simulator software program, a forward or reverse movement of the joystick control handle about the X axis causes an output signal to be generated that is used to simulate control of the elevators of the aircraft and which thus affects the pitch of the aircraft in the simulation, while lateral movement of the joystick control handle about the Y axis produces a corresponding output signal that is used to control the ailerons of the simulated aircraft, and thus affects roll or rotation of the simulated aircraft about its longitudinal axis.

Joysticks are generally designed to function either as on/off devices or as proportional devices. Lower cost joysticks operating as on/off devices only change the state of a positional switch to provide an indication of whether a minimum displacement of the control handle about one of the axes of the joystick has occurred, whereas proportional devices provide output signals having a magnitude varying proportionally with the extent of the displacement of the joystick control handle away from a known point, generally its "center" point. Higher performance software applications, such as flight simulators, require the use of joysticks that provide proportional output signals.

In addition to providing input signals to a computer or other device relative to displacement of the control handle about the X and Y axes, some joysticks provide an input signal corresponding to a third axis, which is commonly referred to as the "Z" axis. The Z axis generally extends longitudinally through the joystick control handle, and the Z-axis output signal typically is indicative of a rotational angular displacement of the joystick control handle about its longitudinally central axis.

In addition to generating control signals in response to user input, some joysticks are designed to provide force or tactile ("haptic") feedback to the user. Such devices are often used with computer games, and the haptic feedback feature adds to the user experience. For example, by providing various types of feedback forces that are applied to the control handle, a haptic joystick can convey to the user the physical sensation of an object controlled by the user in a game or simulation colliding with a wall, moving through mud, driving over a bumpy road, etc. This haptic feedback makes the game or simulation more realistic and entertaining.

In general, most haptic joysticks employ various gimbal mechanisms that enable the joystick control handle to be simultaneously pivoted about two coplanar axes (i.e., the X and Y axes discussed above). One type of gimbal mechanism used in joysticks is commonly referred to as a "quarter gimbal" mechanism. A prior art quarter gimbal 10 of this type is shown in FIG. 1. A quarter gimbal typically includes a control handle shaft 12, to which a control handle (not shown) is fixedly or rotatably coupled. The control handle is pivotally coupled to an X-axis gimbal arm 14 by a pivot bearing 15 and is pivotally coupled to a Y-axis gimbal arm 16 by a pivot bearing 17. The pivot bearings are oriented at an angle of 90 degrees, relative to each other. A cantilevered end 18 of X-axis gimbal arm 14 is pivotally mounted to a base member, e.g., a housing or frame (not shown), by a bearing mount 19 having a centerline 20 that is aligned with the "X" axis, while a cantilevered end 22 of Y-axis gimbal arm 16 is pivotally mounted to the base member by a similar bearing mount 23 having a centerline 24 aligned with the Y axis. When control handle shaft 12 is in its normal "center" position (i.e., in the position shown in the Figure), a centerline 25 of pivot bearing 17 is substantially in coaxial alignment with centerline 20, while a centerline 26 of pivot bearing 15 is substantially in coaxial alignment with centerline 24. Furthermore, all of the centerlines are co-planar when the control handle shaft is in this configuration.

In most prior art haptic feedback devices, a separate servo motor for each axis is operatively coupled to the joystick control handle via various mechanisms such that a desired force and/or velocity can be applied to the joystick control handle having a magnitude that is a function of the torque and/or velocity of the motor drive shaft. In a quarter gimbal configuration, each servo motor is typically coupled to a respective gimbal arm through a transmission such as a gear train, so that the force generated at the joystick control handle is increased and the velocity is reduced. Such a configuration is shown in FIG. 1. As illustrated therein, X-axis gimbal arm 14 is operatively coupled to a servo motor 28 by a gear train 29 that includes a pinion gear 30, a combination gear drive 32, and a drive gear 34. Drive gear 34 is mounted on a drive shaft 36 that is fixedly coupled to X-axis gimbal arm 14. Similarly, Y-axis gimbal arm 16 is operatively coupled to a servo motor 38 by a gear train 39 that includes a pinion gear 40, a combination gear drive 42, and a drive gear 44 mounted on a drive shaft 46, which is fixedly coupled to Y-axis gimbal arm 16.

In addition to providing input forces to the joystick control handle, the position of the joystick control handle needs to be determined. This function is generally performed by various electromechanical or optical position sensors that are operatively coupled to the joystick control handle. Examples of such sensors include rotary or linear potentiometers, optical encoders, and linear displacement voltage transducers (LDVTs). In the exemplary quarter gimbal mechanism shown in FIG. 1, an X-axis potentiometer 48 is coupled to drive shaft 36 via drive gear 34, and a Y-axis potentiometer 50 is coupled to drive shaft 46 via drive gear 44.

Quarter gimbal 10 works in the following manner. It will be initially assumed that the servo motors are not powered and are free to rotate. In response to a user input force upon joystick control handle 12 in a forward direction F along the Y axis and perpendicular to the X axis, control handle shaft 12 pivots about pivot bearing 17, causing X-axis gimbal arm 14 to pivot about centerline 20 (i.e., about the X axis) in a counterclockwise direction. Since forward direction F is along the Y axis (and thus, aligned with centerline 24), there is no moment applied about centerline 24 to cause a rotation of Y-axis gimbal arm 16 about the Y axis. As X-axis arm 14 pivots about the X axis, drive shaft 36 is rotated, causing the rotor of servo motor 28 to rotate through the action of gear train 29. At the same time, the amount of rotation imparted to drive shaft 36 is sensed by X-axis potentiometer 48. A user input force applied in a reverse direction R would produce a substantially similar result, accept that the rotation imparted to drive shaft 36 would then be in a clockwise direction.

In response to a user input force in a direction L (to the left) that is along the X axis and perpendicular to the Y axis, control handle shaft 12 pivots about pivot bearing 15, causing Y-axis gimbal arm 16 to pivot about centerline 24 (i.e., about the Y axis) in a counterclockwise direction. Since direction L is along the X axis (and thus, aligned with centerline 20), there is no moment applied about centerline 20 to cause a rotation of X-axis gimbal arm 14 about the X axis. As Y-axis arm 16 pivots about the Y axis, drive shaft 46 is rotated, causing the rotor of servo motor 38 to rotate through the action of gear train 39. At the same time, the amount of rotation imparted to drive shaft 46 is sensed by Y-axis potentiometer 50. A user input force applied in direction RT (toward the right) would produce a substantially similar result, accept that the rotation imparted to drive shaft 46 would then be in a clockwise direction.

In the foregoing description, for the sake of simplifying the explanation, the user input forces were described as being applied about only a single axis at a time. During normal operation, the user is likely to displace the joystick control handle about both axes simultaneously. This type of control action is readily accommodated by the quarter gimbal configuration, since rotation about each axis is completely independent of the rotation about the other axis.

Now consider the behavior of quarter gimbal 10 when the servo motors are activated. In general, a control signal will be applied to each of servo motors 28 and 38 based on a sensed position of joystick control handle 12 and in accord with game criteria. For instance, a "rumble" effect can be applied to the joystick control handle by rapidly oscillating one or both of the servo motors to simulate the feel of a vehicle in the game rolling over bumpy terrain. Another common effect comprises applying a resistance to the joystick control handle that is proportional to the displacement of the control handle about an axis, such as to simulate the force that would be felt when a character in the game advances into an elastic medium. Under this effect, a command signal is generated to increase the torque of a given servo motor as a function of a displacement of the control handle about the axis corresponding to the given servo motor.

Under both of the foregoing effects, as well as other effects, significant loading is applied to the gimbal arms, bearing mounts, and pivot bearings in a quarter gimbal mechanism. In addition, the cantilever configuration of the gimbal arms can lead to their undesired deflection. Ideally, the more rigid the overall support mechanism for the control handle, the better the haptic feedback response that will be experienced by a user. Accordingly, in order to properly implement the quarter gimbal configuration, it is necessary to employ parts with very tight tolerances and rigidity. While the cost of such parts is acceptable for certain applications of more expensive haptic feedback joysticks, such as those that are employed in commercial or military aircraft simulators, such parts are generally too expensive for use in the personal computer video game market.

Another problem that occurs with some haptic feedback joysticks concerns the interface between the drive gear and drive shaft for each respective axis. Since cost reduction is a significant concern with products marketed for use with video game players, most of the components, including the drive gears, of joysticks targeted for this market are made of plastic. Typically, each drive gear is drivingly coupled to a corresponding drive shaft using a keyway or spline to prevent the drive gear run spinning around the drive shaft. In general, the loading on the keyway or spline teeth is substantial, so that the interface between the drive gear and drive shaft is a common point of failure. The frequency of these failures is increased due to the extreme level of vibration that often accompanies haptic feedback effects. Accordingly, it is desirable to provide an interface for coupling each drive gear (or drive member in the case of a transmission that employs belts or cables) to its respective gimbal that is substantially less susceptible to damage or failure caused by heavy loading and vibration. Furthermore, it is desirable to provide a haptic feedback joystick that primarily employs low-cost components and materials, yet provides performance that is as good as or better than more expensive devices.

SUMMARY OF THE INVENTION

In accord with the present invention, a haptic feedback joystick is provided that addresses many of the foregoing limitations in the prior art. Signals are produced by the joystick for use in controlling a computer software program such as a computer game, in response to a pivotal displacement of a joystick control handle about two orthogonal axes. The joystick control handle is coupled to a full-gimbal assembly, which is connected to electric motors that provide a haptic feedback force. The full-gimbal assembly includes an upper and lower gimbal operatively coupled to a corresponding motor. The movement of the control handle about each axis is sensed by position sensors, which produce signals that are input to a computer running the software program. In response to the position of the joystick control handle and in accord with the software program, haptic feedback signals are generated and transmitted to the joystick and decoded by a motor controller. The motor controller produces appropriate electrical currents that energize the motors to produce the desired haptic feedback force effect applied to the control handle, which is experienced by a user gripping the control handle. Preferably, the joystick also includes a third input axis (the "Z" axis), and rotation of the joystick control handle about the Z axis produces a third proportional output signal.

The present invention is thus directed to a haptic feedback joystick that includes a control handle adapted to enable a user to apply an input force that pivotally displaces the control handle about the X, Y, and/or Z axis. The control handle is supported by a control handle shaft, which is coupled to a multiple axis, full-gimbal assembly that enables the control handle shaft (and thus the control handle) to be pivotally displaced about the X and Y axes. The full-gimbal assembly includes an upper gimbal having an opening through which the control handle shaft extends. Opposing ends of the upper gimbal are coupled to a frame so that the upper gimbal is rotatable about the Y axis, and is pivotally coupled to the control handle shaft so as to enable rotation of the control handle shaft about the X axis. A lower gimbal, which is preferably identical to the upper gimbal, is also operatively coupled at opposing ends to the frame so as to be rotatable about the X axis and is pivotally coupled to the control handle shaft so as to enable rotation of the control handle shaft about the Y axis. Each of the upper and lower gimbals are coupled to a corresponding angular position sensor—each angular position sensor preferably comprising a potentiometer that senses the displacement of the control handle about one of the X and Y axes. Output signals indicative of the position of the control handle about these two axes are transmitted to a computer executing an application program. The computer generates haptic feedback signals corresponding to a desired haptic feedback force effect determined as a function of the control handle position and in accord with application program criteria. The haptic feedback signals are transmitted to a motion controller in the joystick that decodes the signals and produces appropriate electrical drive currents for the motors that are operatively coupled to the upper and lower gimbals, i.e., using a different motor for each gimbal. When thus energized, the motors produce haptic feedback torques that are applied to the control handle, tending to cause it to rotate about the X and/or Y axes.

Preferably, the control handle shaft includes a lower portion having a first pair of support shafts extending in opposite directions along a common centerline that is generally aligned with the X axis. A second pair of support shafts, orthogonal to the first pair, also extend in opposite directions from the control handle shaft along a common centerline that is generally aligned with the Y axis. Each of the upper and lower gimbals comprises a yoke-shaped frame that includes a pair of bearings mounted on opposing sides of the frame. The upper gimbal bearings are adapted to rotatably support the X-axis support shafts and the lower gimbal bearings are adapted to rotatably support the Y-axis support shafts.

Additionally, the control handle shaft preferably comprises an upper part and a lower part. The upper part includes a saddle from which the X-axis support shafts extend and in which a recess is defined. The Y-axis support shafts extend from the lower part. The lower part fits within the recess in the upper part enabling the lower and upper parts to be coupled together.

Each motor is operatively coupled to a corresponding one of the upper and lower gimbals via a corresponding transmission. Each transmission includes an input member coupled to one of the motors and an output member coupled to the one of the upper and lower gimbals. Preferably, the input member of each transmission includes a pinion gear coupled to one of the motors, and the output member comprises a sector gear operatively coupled to the pinion gear through a combination gear that is driven by the pinion gear. Each combination gear includes a large gear and a small gear mounted on a common rotational axis. The pinion gear engages the large gear, while the small gear engages the sector gear.

Preferably, each of the upper and lower gimbals includes a yoke-shaped frame having a pair of drive pins extending from a first end and having a shaft extending from a second end that is opposite the first end. The shaft of each yoke-shaped frame is received by a corresponding bearing mounted to the primary frame. Each of the transmissions includes a transmission bracket mounted to the primary frame that supports one of the motors. In addition, each transmission bracket includes a shaft extending from the bracket that is aligned with a different one of the X and Y axes, around which the sector gear rotates. Each transmission bracket also includes a pair of clearance slots through which the drive pins of a corresponding gimbal extend. The drive pins are received by holes defined in the sector gear so that the sector gear is fixedly coupled to the gimbal. A bearing support is thus provided for each end of both gimbals enabling the gimbals to rotate.

By employing a full-gimbal assembly in the joystick, many of the deficiencies commonly associated with quarter-gimbal mechanisms are avoided. Furthermore, by coupling the drive members to the gimbals with pairs of drive pins, as indicated above, premature failure of the drive assembly due to wear is avoided.

It is further preferable for the control handle to be rotatably mounted on the control handle shaft so as to enable rotation of the control handle about a longitudinal axis of the control handle shaft corresponding to a "Z" axis. A position sensor, preferably a potentiometer, produces a signal indicative of the angular position of the control handle about the Z axis, as the control handle is rotated about this axis. A spring provides a bias force tending to return the control handle to a center position about the Z axis, if the joystick control handle is rotated away from the center position.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1:
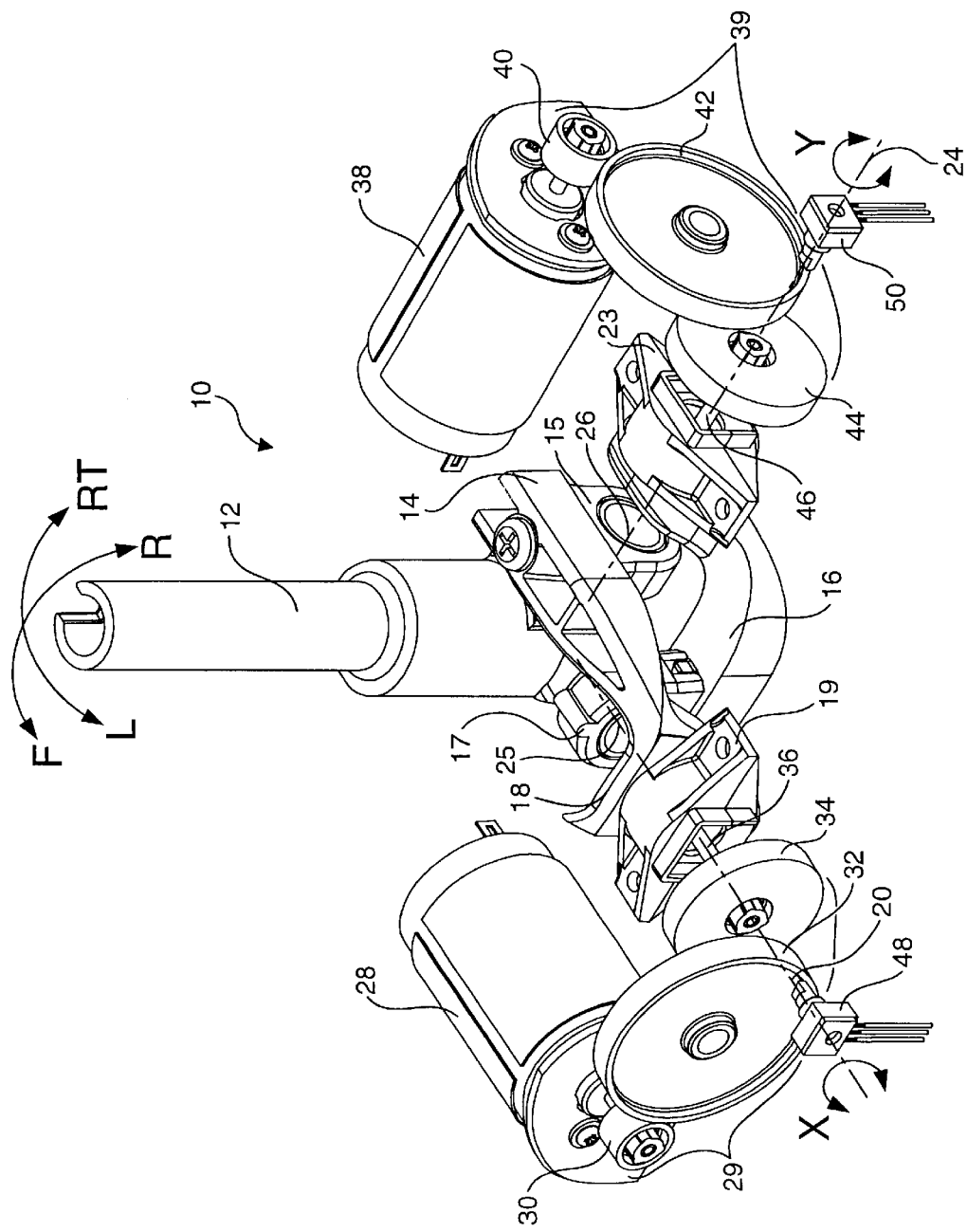
FIG. 1 (prior art) is an isometric view of a motorized quarter-gimbal mechanism that is used in a conventional haptic feedback joystick.
Figure 2:
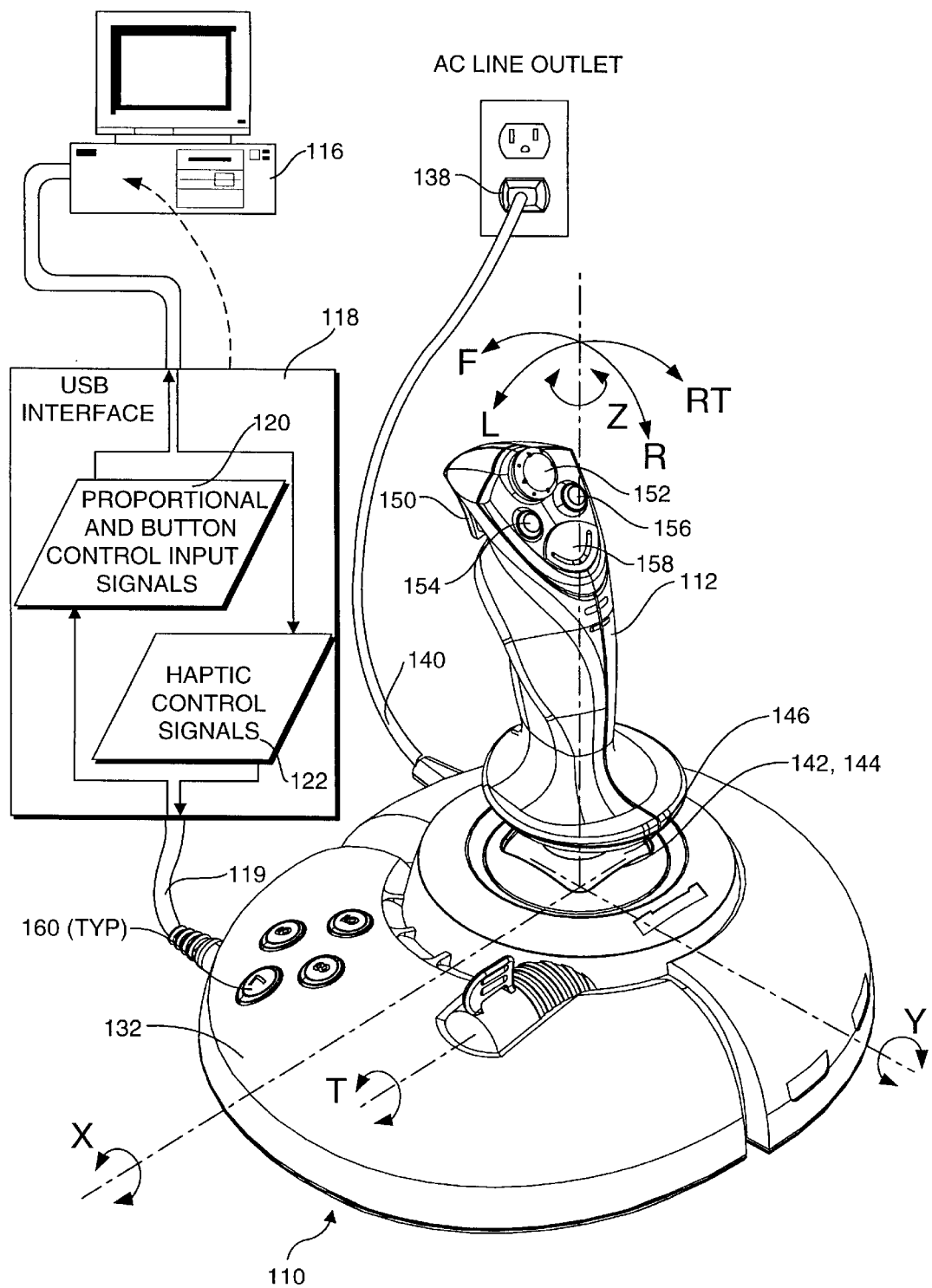
FIG. 2 is a rear isometric view of a haptic feedback joystick according to the present invention.
Figure 3:
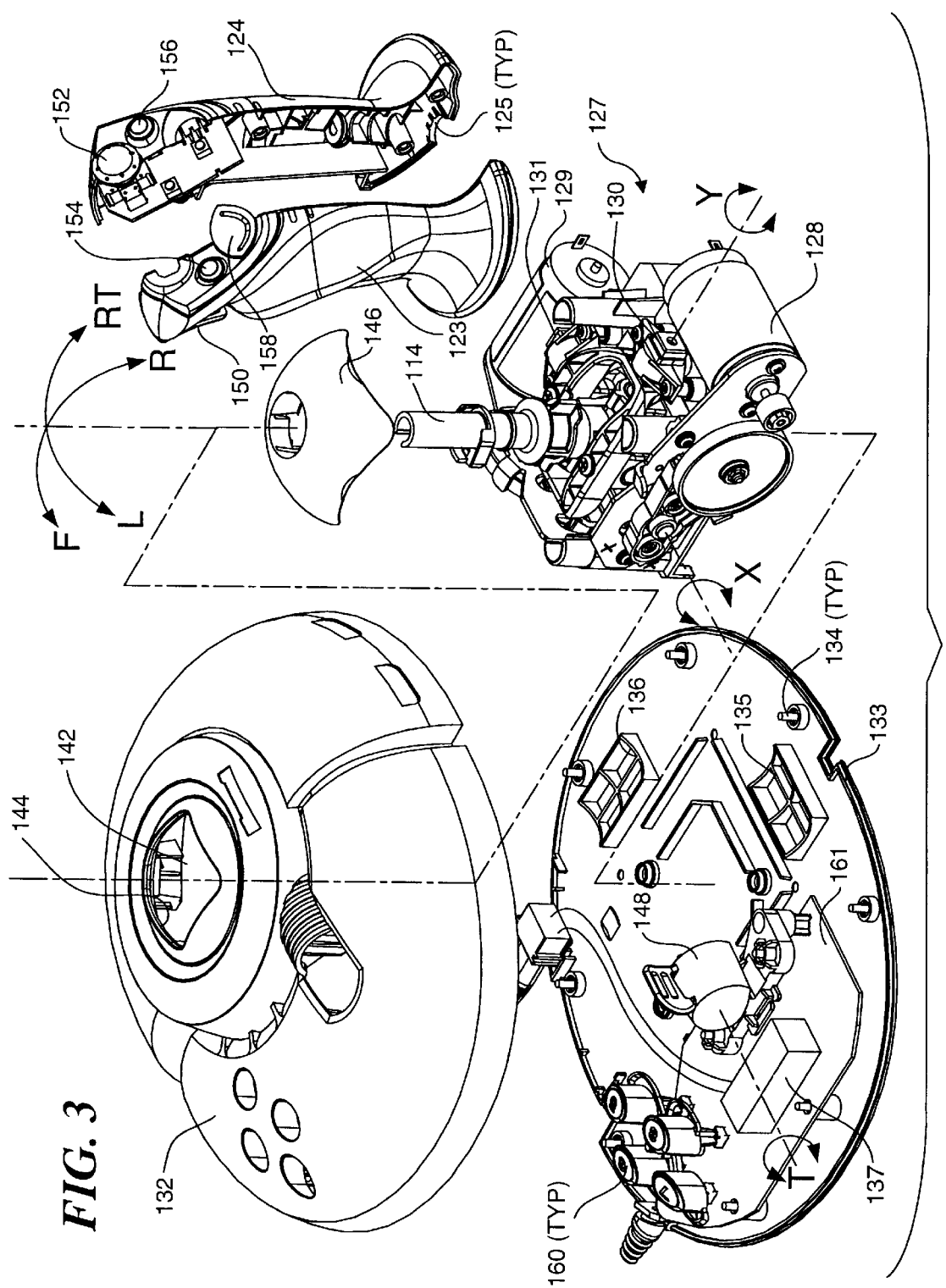
FIG. 3 is an exploded assembly view showing components and sub-assemblies of the haptic feedback joystick in accord with the present invention.

With reference to FIGS. 2 and 3, a preferred embodiment of a joystick 110 in accord with the present invention enables a user to control three proportional input signals for a computer game by rotating or pivoting a control handle 112 about either of a pair of orthogonal axes, labeled "X" and "Y," and/or by rotating control handle 112 about a third axis, labeled "Z," which is coincident with a longitudinal axis of a control handle shaft 114. Joystick 110 is preferably connected to a Universal Serial Bus (USB) port 118 in a computer 116 through a USB cable 119. The USB port provides a bidirectional communications link for the three proportional input signals and various control button input signals (as indicated by input signal data in a block 120) in regard to a computer game executing on computer 116. In response to the input signals and as determined by the computer game, appropriate haptic control signals 122 are generated and transmitted to joystick 110 through the USB port.

With reference to FIG. 3, control handle 112 includes a left-half shell 123 and a right-half shell 124, each of which include a plurality of cylindrical bearing surfaces 125 that are adapted to rotatingly engage adjacent surfaces of control handle shaft 114 such that control handle 112 is supported by the control handle shaft, but can be rotated about the longitudinal axis of control handle shaft 114. This longitudinal axis defines the Z axis.

Figure 5:
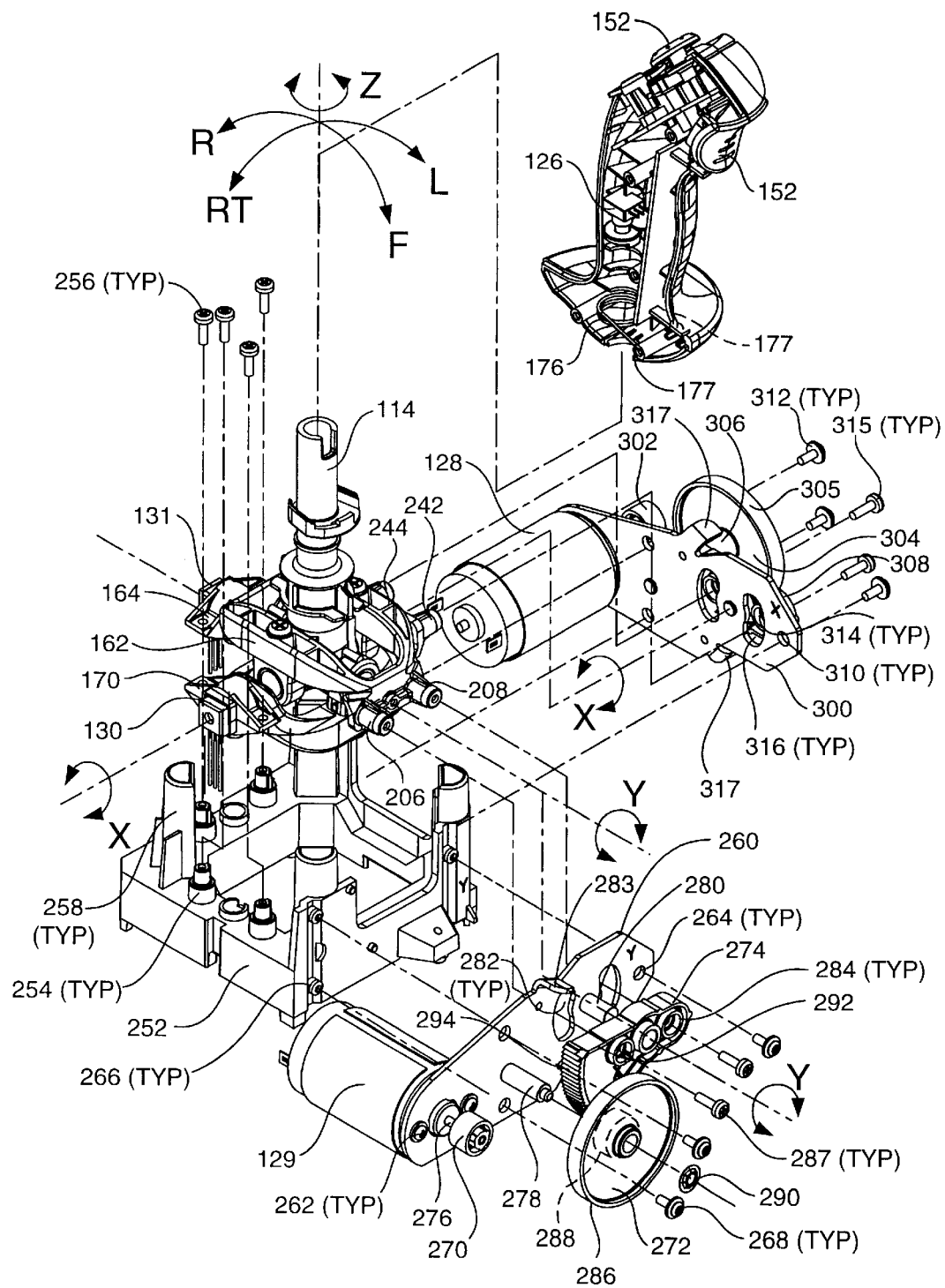
FIG. 5 is an exploded assembly view showing the components of a full-gimbal assembly used to provide haptic feedback forces that act on the control handle of the joystick of the present invention.

As shown in FIG. 5, a Z-axis potentiometer 126 is disposed within the control handle and is coupled to control handle shaft 114 such that the input shaft of the potentiometer is rotated relative to the potentiometer's body when the control handle is rotated about the Z axis. Accordingly, Z-axis potentiometer 126 controls a voltage of a signal output from the joystick so that the voltage is proportional to the extent of rotation of the control handle about the Z axis.

Referring back to FIG. 3, it will be noted that a lower end of control handle shaft 114 is pivotally coupled to a full-gimbal assembly 127, which includes an X-axis motor-128 and a Y-axis motor 129. These two motors apply haptic feedback torques acting on the control handle to rotate it about the X and Y axes, respectively, in response to haptic control signals 122. The full-gimbal assembly enables control handle shaft 114 to be pivoted about the X and Y axis, and further details of the full-gimbal mechanism are discussed below.

Full-gimbal assembly 116 is disposed in a housing 132 that is connected to a base 133 by a plurality of fasteners 134. Base 133 includes a pair of motor supports 135 and 136, which are adapted to mate with the undersides of corresponding X- and Y-axis motors 128 and 129 (when assembled there will be 1 mm clearance between motor supports and the motors to keep the plastics away from the hot motors. The supports will prevent excessive movement of the motors.). Also disposed within housing 132 is a power supply/motor controller 137 that receives input power supplied from a conventional AC line outlet receptacle 138 through a power cable 140. The power supply/motor controller provides separate pulse width modulated electrical drive currents to selectively energize each of the X- and Y-axis motors 128 and 129. Full-gimbal assembly 127 also includes an X-axis potentiometer 130 and a Y-axis potentiometer 131 that control the magnitudes of the voltage of the output signals, so that they are proportional to the displacement of control handle shaft 114 about the X and Y axes, respectively.

Housing 132 includes a generally square-shaped opening 142 (with chamfered corners) through which an upper portion of control handle shaft 114 extends. A lip 144 is formed along the perimeter of opening 142 and is shaped so as to define a spherical bearing surface that slidingly engages a spherical-shaped upper surface of a hemispherical collar 146, which is coupled to control handle shaft 114. As control handle 112 is pivoted about the X and Y axes, hemispherical collar 146 slides against lip 144, thereby preventing debris from entering the full-gimbal assembly and preventing a user from injuring a finger that might otherwise be inserted through the opening.

In FIGS. 2 and 3, joystick 110 is shown in a left rear-quarter view, relative to the perspective of a user of the joystick. In the perspective these Figures, moving control handle 112 in a forward direction "F" corresponds to a counterclockwise rotation of the control handle about the X axis (relative to the indicated view), while moving the control handle in a reverse direction "R" (i.e., toward the user) corresponds to a clockwise rotation of the control handle about the X axis (relative to the indicated view). In a similar manner, moving the control handle toward the right (designated by "RT") corresponds to a clockwise rotation of the control handle about the Y axis, while moving the control handle toward the left ("L") corresponds to a counterclockwise rotation about the Y axis. Rotation of control handle 112 about the central longitudinal axis of control handle shaft 114 in either the clockwise or counterclockwise direction corresponds to the rotation of the control handle about the Z axis.

In addition to the proportional input control signals provided by potentiometers 126, 130, and 131, joystick 110 also enables a user to provide an additional proportional input control signal through displacement of a throttle lever 148 that is pivotally mounted to base 133 and is coupled to a potentiometer (not shown that produces an output signal indicative of the displacement of the throttle lever about a throttle axis T. Furthermore, "on/off"-type control signals are produced in response to a user actuating any of a plurality of control switches/buttons that are disposed on an upper portion of control handle 12, including a trigger switch 150, an 8-way point of view (POV) switch 152, and control buttons 154, 156, and 158. In addition, the joystick also enables a user to selectively produce input signals by actuating any of a plurality of buttons 160 disposed on housing 132. Signal conditioning and processing of the proportional potentiometer signals and of the signals produced by the various buttons or controls on the joystick is carried out by electronic circuitry on a circuit board 161, which mounted to base 133.

Figure 4:
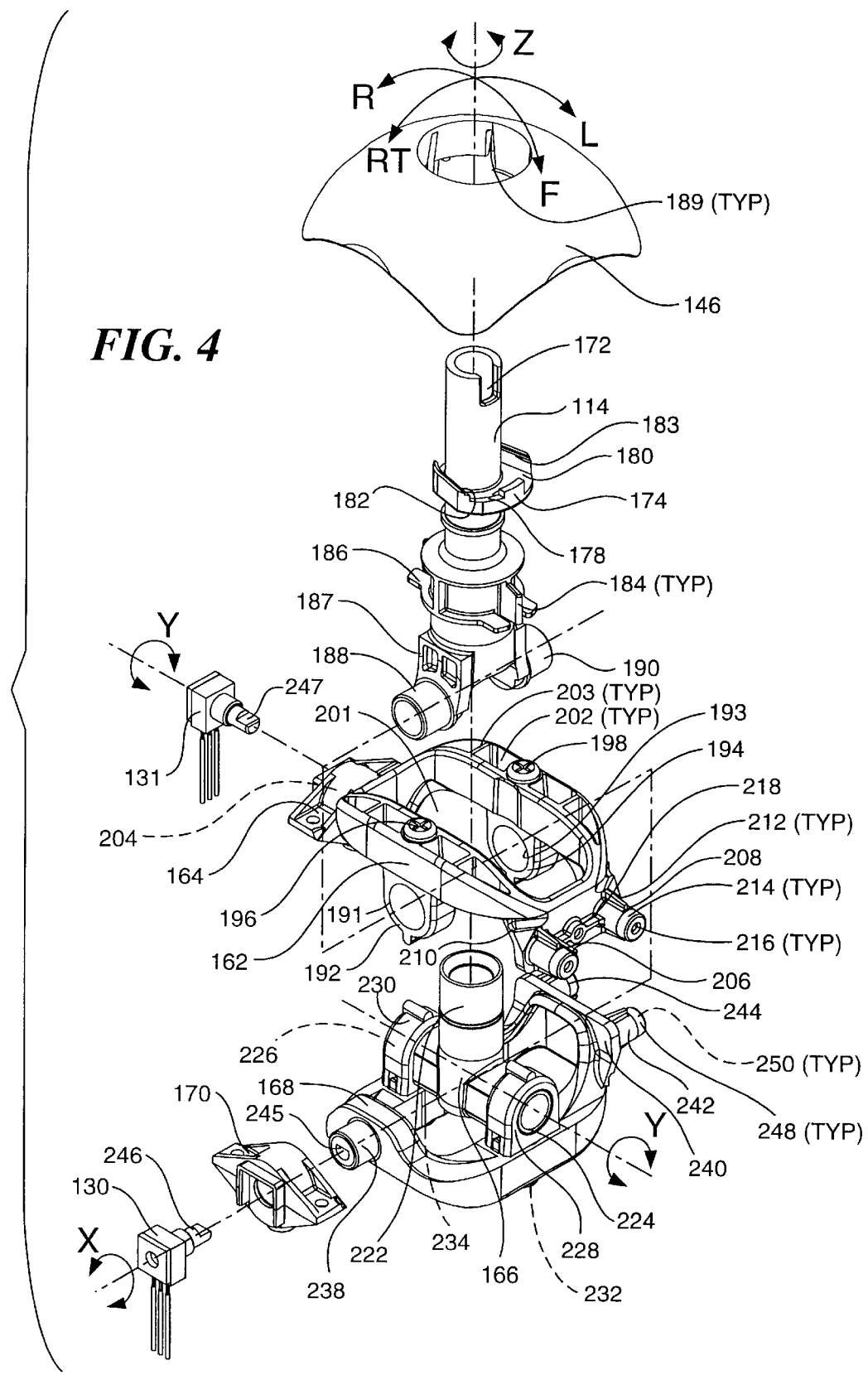
FIG. 4 is an exploded assembly view showing the components of a full-gimbal assembly employed by the haptic feedback joystick of FIGS. 2 and 3.

With reference to FIG. 4, primary components of full-gimbal assembly 127 include control handle shaft 114, an upper gimbal frame 162, an upper gimbal bearing mount 164, a lower gimbal input shaft 166, a lower gimbal frame 168, and a lower gimbal bearing mount 170. Control handle 114 includes a slot 172 that is adapted to receive a tab (not shown) in a cap 173 (shown in FIG. 6). Cap 173 is coupled to an input shaft of Z-axis potentiometer 126 so that the input shaft is turned with respect to the body of the potentiometer when control handle 112 is rotated relative to control handle shaft 114.

Figure 6:
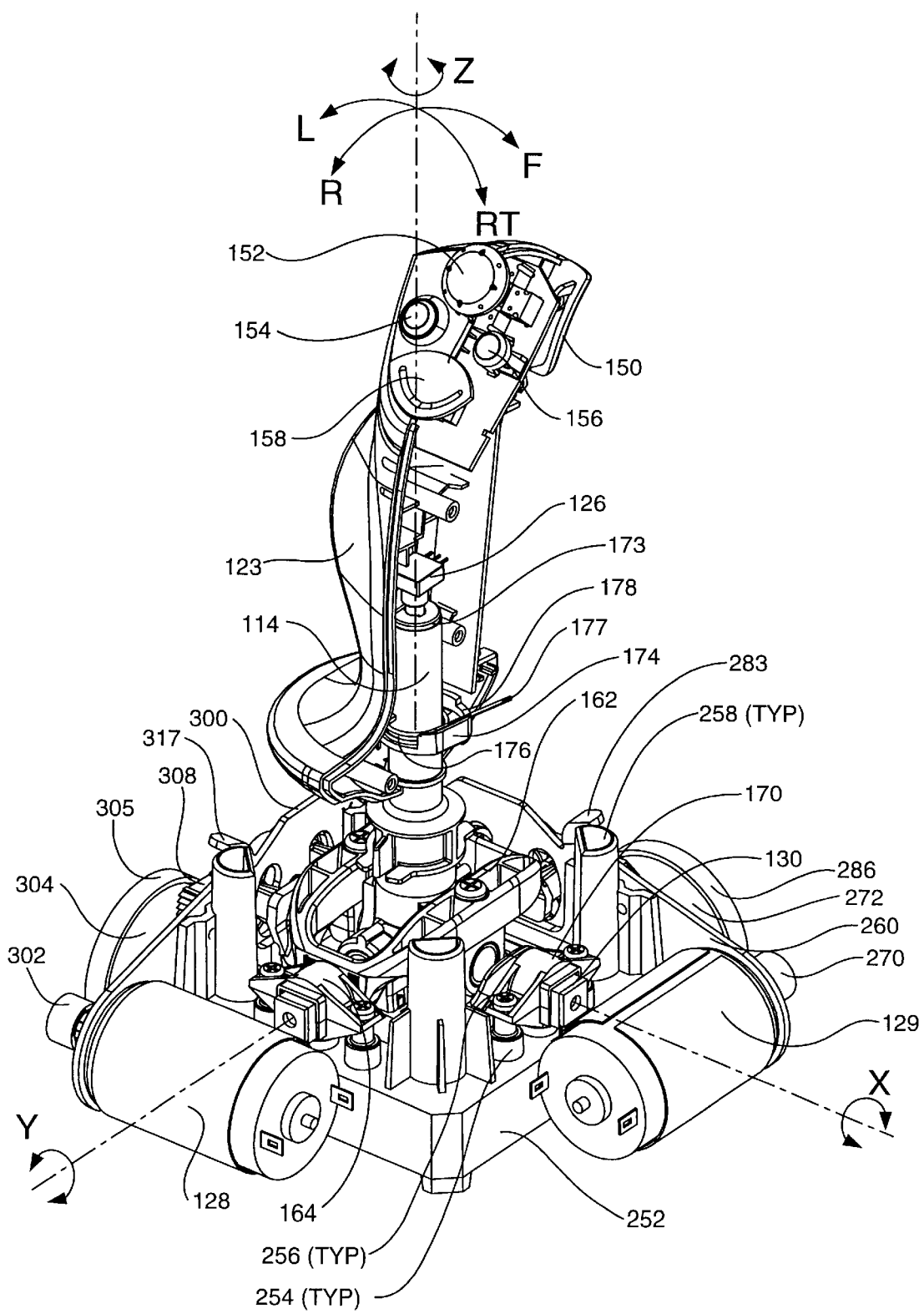
FIG. 6 is a rear isometric view of the full-gimbal assembly of FIG. 5, when viewed from the right.

Referring now to FIGS. 5 and 6, a torsion spring housing 174 in which a torsion spring 176 is disposed is formed in a middle section of control handle shaft 114. Torsion spring 176 comprises a loop that encircles control handle shaft 114 and a pair of tangs 177 (only one of which is shown) that are nested within torsion spring housing 174 such that one of tangs 177 extends through a slot 178, while the other tang 177 extends through a slot 180 (shown in FIG. 4). When left half-shell 123 and right half-shell 124 are assembled about control handle shaft 114, tangs 177 engage respective side walls 182 and 183 defined in torsion spring housing 174. As control handle 112 is rotated about control handle shaft 114 in either direction away from a centered position, the end of one of tangs 177 is displaced away from an adjacent one of side walls 182 and 183, while the other tang 177 remains in contact with its adjacent side wall. As a result, a torque about the Z axis is produced by torsion spring 176 that opposes rotation of the control handle around the Z axis, away from the centered position of the control handle.

A plurality of protrusions 184 and a shelf 186 couple control handle shaft 114 to hemispherical collar 146 and are formed in a lower portion of control handle shaft 114. A plurality of slots 189 are defined in hemispherical collar 146 so as to receive respective protrusions 184 to control input shaft 114, while shelf 186 controls the vertical position of hemispherical collar 146 relative to the control handle shaft.

Control handle shaft 114 is able to freely pivot about the X axis with respect to upper gimbal frame 162. A pair of support shafts 188 and 190 extend from opposing sides of a saddle 187 disposed toward the bottom of the control handle shaft and share a common centerline that aligned with the X axis. Support shafts 188 and 190 are received by corresponding plain bearing 191 and 193, which are integrally formed in bearing bracket 192 and 194, respectively. The bearing brackets extend downwardly from upper gimbal frame 162 and are coupled to upper gimbal frame 162 by corresponding fasteners 196 and 198.

Turning to FIG. 4, it will be noted that upper gimbal frame 162 is formed as a yoke that includes an opening 201 through which an upper portion of control handle shaft 114 passes when the components are assembled. Preferably, upper gimbal frame 162 comprises a plurality of cavities 202 separated by ribs 203 to reduce its weight and cost. A support shaft 204 that rotates within a plain bearing integrally formed in a bearing mount 164 extends from one end of upper gimbal frame 162, while a pair of drive pins 206 and 208 extend from a bracket 210 depending from an opposite end of the gimbal frame. Each of drive pins 206 and 208 includes a plurality of stiffeners 212 and a cylindrical portion 214 in which a threaded hole 216 (this hole is not threaded before the assembly. The screw is a thread forming screw and will form a thread during assembly) is defined. In addition, a stiffener 218 extends across bracket 210 to provide structural rigidity to the bracket and to drive pins 206, 208.

Lower gimbal input shaft 166 comprises a cylindrical upper portion 222 that is mated with control handle shaft 114 upon assembly such that pivotal motion of the control handle shaft results in a corresponding motion of lower gimbal input shaft 166. Note that both control handle shaft 114 and lower gimbal input shaft 166 are hollow so as to enable lead wires from Z-axis potentiometer 126, trigger switch 150, POV switch 152, and buttons 154, 156, and 158 to pass through and be routed to circuit board 161. Lower gimbal input shaft 166 also includes a pair of shafts 224 and 226 extending from opposing sides of a lower portion thereof and sharing a common centerline that is aligned with the Y axis that are pivotally mounted within respective bearing brackets 228 and 230. These bearing brackets are mounted on lower gimbal frame 168 using fasteners 232 and 234. It is noted that each of the upper and lower gimbal frames 162 and 168 preferably are of identical form such that the gimbal frames can be used interchangeably (In order for the upper and lower gimbal frames to be identical, the potentiometer 131 and 130 would need to be mounted differently because of the D shaft 247 and 246. In order to minimize flipping of work piece in the assembly line, pot 131 and 130 were designed to be assembled the same way, i.e., the flates on the D shaft were facing upward as shown in FIG. 4. To do this, the D holes in Upper Gimbal and Lower Gimbal oriented the opposite direction. So they were not interchangeable in the current design.). Accordingly, lower gimbal frame 168 is yoke-shaped and is connected at opposing ends to a support shaft 238 and a bracket 240 from which a pair of drive pins 242 and 244 extend. Support shaft 238 is rotatably mounted within lower gimbal bearing mount 170 and includes a relief 245 comprising a foreshortened cylinder for receiving a similar flatted portion of an input shaft 246 of X-axis potentiometer 130 so as to couple the potentiometer's input shaft to lower gimbal frame 168. (Although not shown, a similar relief is formed in support shaft 204 for receiving an input shaft 247 of Y-axis potentiometer 131 so as to couple the potentiometer's input shaft to upper gimbal frame 196.) Drive pins 242 and 244 are substantially identical to drive pins 206 and 208 discussed above, and include a cylindrical portion 248 and threaded hole 250.

The action of full-gimbal assembly 127 in response to a pivotal displacement of control handle shaft 114 by a user will now be described, without considering any force applied by motors 128 and 129 and their corresponding transmission components. With respect to a displacement of control handle shaft motion 114 in forward direction F, support shafts 188 and 190 pivot within respective bearing brackets 192 and 194. As a result, there is no motion imparted about the Y axis, since the pivot motion is solely about the X axis, which is coplanar with the Y axis and thus imparts no moment about the Y axis. Due to coupling between control handle shaft 114 and lower gimbal input shaft 166, a moment is applied to lower gimbal frame 168 that results in support shaft 238 rotating within bearing mount 170, thereby causing lower gimbal frame 168 to rotate about the X axis. At the same time, input shaft 246 of X-axis potentiometer 130 is rotated accordingly, enabling the extent of rotation of the control handle about the X axis to be detected through use of suitable signal conditioning and processing electronic circuitry disposed on circuit board 161. Details of the circuitry required for such signal conditioning and processing are well known by those of ordinary skill in the art, and accordingly, further details are not disclosed herein. Pivotal displacement of control handle shaft 114 in a reverse direction R results in a similar rotation about the X axis, except that this time, the rotation is in an opposite direction.

A pivotal displacement of control handle shaft 114 in a left direction L and a right direction RT results in a similar rotation about the Y axis, with no rotation about the X axis. For example, a pivotal displacement of control handle shaft 114 toward left direction L causes a moment to be applied to upper gimbal frame 162, which results in rotation of support shaft 204 within bearing mount 164 about the Y axis in a clockwise direction. At the same time, support shafts 224 and 226 of lower gimbal input shaft 166 are caused to pivot about the Y axis within their respective bearing brackets 228 and 230. Since the Y axis is coplanar with the X axis, this rotation of the control handle about the Y axis imparts no moment about the X axis. A pivotal displacement of control handle shaft 114 toward right direction RT produces a similar result, except that it is in a counterclockwise direction about the Y axis.

It should be clear that a displacement of control handle shaft 114 about both the X and Y axes is common during game playing activities and simply produces a combination of the above described movements that is readily supported by the full-gimbal assembly. Furthermore, the configuration of the full-gimbal assembly is such that a maximal displacement of the control handle about both the X and Y axes can occur simultaneously, and so that a maximal displacement about one of the X and Y axes can be maintained while moving control handle 112 through a full range of motion about the other axis.

As discussed above, full-gimbal assembly 127 provides haptic feedback forces in response to joystick control handle inputs and game criteria. In order to perform this function, it is necessary to be able to apply haptic feedback torques acting on control handle 112 about each of the X and Y axes. This function is accomplished by the motor and gear train described above for each axis. The motors are coupled to the frame of the full-gimbal assembly, as follows.

Figure 7:
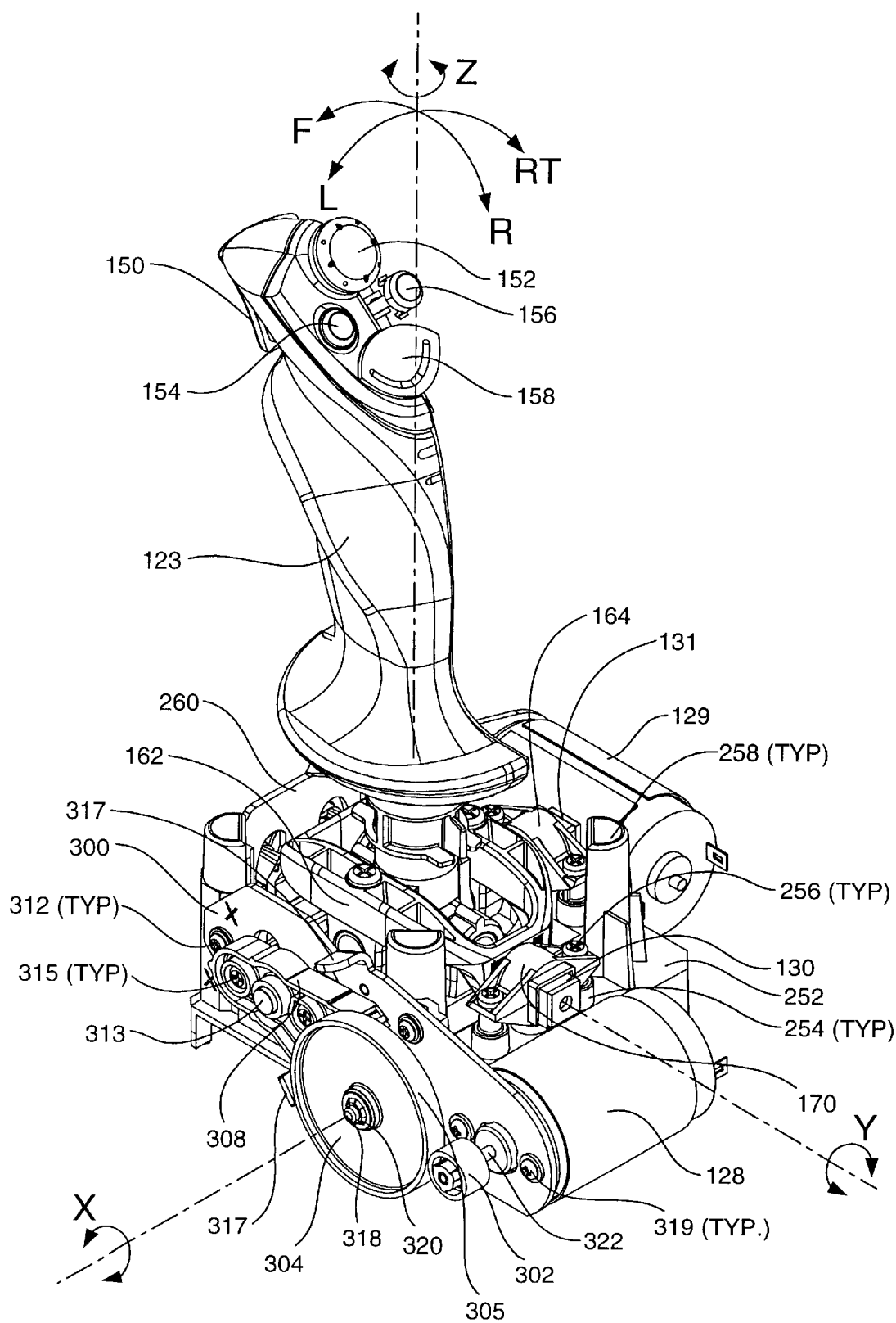
FIG. 7 is a rear isometric view of the full-gimbal assembly of FIG. 5, when viewed from the left.

With reference to FIGS. 5–7, full-gimbal assembly 127 is mounted to a frame 252 that is in turn attached to base 133 with a plurality of threaded fasteners (not shown). Frame 252 includes a plurality of threaded bosses 254 to which bearing mounts 164 and 170 are respectively mounted through use of corresponding pairs of fasteners 256. Frame 252 also includes four extended bosses 258 that are arranged at the corners of frame 252 and are adapted to receive corresponding tabs (not shown) that depend from housing 132.

Each of lower and upper gimbal frames 162 and 168 are coupled to a corresponding motor and transmission that enables the gimbal frames to exert a feedback force upon control handle 112 about the gimbal axes in response to haptic feedback control signals. Y-axis motor 129 is mounted to a transmission bracket 260 by a pair of fasteners 262. Transmission bracket 260 includes a plurality of alignment holes 264 that are configured opposite corresponding threaded alignment pins 266 that are formed in frame 252 such that transmission bracket 260 can be secured to frame 252 by a plurality of fasteners 268. The transmission components include a pinion gear 270, a combination gear 272, and a sector gear 274. Pinion gear 270 is mounted on a shaft 276 that is coupled to the rotor of Y-axis motor 129. Combination gear 272 is rotatably mounted on a support shaft 278 and extends outwardly from transmission bracket 260. Likewise, sector gear 274 is rotatably mounted on a support shaft 280 that extends outwardly from transmission bracket 260. Transmission bracket 260 further includes a pair of arcuate slots 282 through which drive pins 206 and 208 move freely as the control handle of the joystick pivots, and a pair of tabs 283 that limit the extend to the rotation of sector gear 274 in each direction.

Sector gear 274 includes a pair of alignment holes 284 that receive cylindrical portions 214 of drive pins 206 and 208. Upon assembly, sector gear 274 is secured to upper gimbal frame 162 with a pair of fasteners 286 that are threaded into threaded holes 216 in drive pins 206 and 208. Stiffeners 212 define a backing surface, and sector gear 274 is sandwiched between this backing surface and the heads of fasteners 286 upon assembly, so that a rigid coupling exists between upper gimbal frame 164 and sector gear 274. As a result, upper gimbal frame 162 is provided with a gimbaled bearing support at each of its opposite ends, one of which is the bearing surface upon which the sector gear is mounted. Additionally, when control handle 114 is displaced about the Y axis through a given angle, sector gear 274 is caused to rotate through an equivalent angle.

Combination gear 272 includes a large gear 286 and a small gear 288 that share a common axis. Small gear 288 extends from the central hub of the combination gear, and the large gear is the larger diameter portion of the combination gear. Combination gear 272 is secured to support shaft 278 by a snap ring retainer 290 and is prevented from moving forward toward transmission bracket 260 by sliding engagement with a ridge 292 formed in the periphery of sector gear 274. When driven by Y-axis motor 129, pinion gear 270 engages large gear 286, causing the combination gear to rotate. The gear teeth (not specifically shown) of small gear 288 engage plurality of gear teeth 294 of sector gear 274, causing sector gear 274 to rotate, thereby producing a torque about the Y axis that results in a haptic feedback force upon control handle 112 about the Y axis in the direction of the rotation of the sector gear. Movement of the control handle by the user about the Y axis produces a corresponding motion of the sector gear that is transmitted through the combination gear back to the pinion gear, causing the rotor of the Y-axis motor to rotate in corresponding fashion. It should be noted that in some instances, the desired haptic feedback effect will require a torque to be applied to the control handle that causes no or little rotation of the sector gear, as would be the case if the desired effect was to simulate a user controlled object (in a game) bumping into a wall (in the game).

The extent of the rotation of the Y-axis motor 129 rotor caused by the user moving the control handle is equal to the extent of rotation of the sector gear times the gear ratio of the transmission, which is approximately 18.3. Similarly, the amount of torque produced by Y-axis motor 129 is equal to the gear ratio times the amount of torque produced at the motor's rotor. By controlling the torque and/or velocity of Y-axis motor 129, a desired haptic feedback torque can thus be readily produced so that a desired force effect is applied to control handle 112.

A substantially identical motor and transmission is provided to generate haptic feedback forces about the X axis. These include X-axis motor 128, a transmission bracket 300, a pinion gear 302, a combination gear 304 comprising a large gear 305 and a small gear 306, and a sector gear 308. Transmission bracket 300, which includes a plurality of alignment holes 310 is secured to frame 252 by a plurality of fasteners 312. Sector gear 308, which is rotatably mounted on a shaft 313 extending outwardly from transmission bracket 300, includes a pair of alignment holes 314 that are adapted to receive cylindrical portions 248 of drive pins 242 and 244. A pair of fasteners 315 are threaded into threaded holes 250 to secure sector gear 308 to drive pins 242 and 244. Additionally, drive pins 242 and 244 are enabled to pass through transmission bracket 300 by means of a pair of arcuate slots 316, and transmission bracket 300 includes a pair of tabs 317 for limiting the rotation of sector gear 308 in each direction. X-axis motor 128 is mounted to transmission bracket 300 with a pair of threaded fasteners 319.

Combination gear 304 is rotatably mounted on a support shaft 318 that extends outwardly from transmission bracket 300 and is secured to support shaft 318 by a snap ring retainer 320. Pinion gear 302, which engages large gear 305 of combination gear 304, is mounted on a shaft 322 that is coupled to the rotor of X-axis motor 128. As in the case with the Y-axis transmission, sector gear 308 engages small gear 306 of combination gear 304, while large gear 305 engages sector gear 308.

In a manner similar to that discussed above with respect to displacement of the control handle shaft about the Y axis, a displacement of control handle shaft 114 about the X axis causes lower gimbal frame 168 to pivot about the X axis, causing sector gear 308 to rotate. This rotation causes combination gear 304 and pinion gear 302 to rotate, thereby rotating the rotor of X-axis motor 128. As was the case above, the extent of rotation of the rotor is equal to the extent of rotation of sector gear 308 times the gear ratio of the transmission. The converse is also true. That is, the amount of torque applied at sector gear 308 by energizing X-axis motor 128 is equal to the amount of torque produced at the rotor of X-axis motor 128 times the gear ratio of the transmission. As a result, by controlling the torque and/or velocity of X-axis motor 128, a desired haptic feedback force can also readily be applied to control handle 112 relative to the X axis.

It is preferable to fabricate most of the components used in joystick 110 from plastics that are suitable for high-volume injection molding of the parts, which is the preferred manufacturing technique for these components, although other types of plastic and other forming processes may alternatively be used. In particular, the components ideally suited for injection molding include upper and lower gimbal frames 162 and 168, bearing mounts 164 and 170, bearing brackets 192, 194, 228, and 230, control handle shaft 114, lower gimbal input shaft 166, hemispherical collar 146, upper housing 132, base 133, left-half shell 123, and right-half shell 124. In addition, a plastic that provides good self-lubricating properties should be used for the bearing mounts and bearing brackets, to ensure that these parts are provided with relatively low friction (and low wear) bearing surfaces. Transmission brackets 260 and 300 are preferably fabricated of sheet metal using common metal forming techniques, such as stamping. It is further noted that where possible, many of the foregoing components have been designed to be identical with corresponding other components. For example, the upper and lower gimbal frames, and corresponding bearing brackets and bearing mounts for the full-gimbal assembly are identical. A particular advantage of the full-gimbal configuration of the present invention is that a single gimbal frame component is suitable for use with either the upper or lower gimbals.

In the foregoing description, each of the transmissions for the X and Y axes comprise a set of gears, including a sector gear, a combination gear, and a pinion gears. It is noted that other types of transmissions can alternatively be used, including transmissions that employ toothed drive belts and pulleys, cables and pulleys, or a combination of gears, drive belts and/or cables. Additionally, a full gear can be used in place of the sector gears, although sector gears are preferred in the embodiment discussed above because they provide a large gear radius without requiring the space of a conventional circular gear, and are lower in weight. Furthermore, appropriate servo motors that produce large torques at low speeds (through use of high-strength magnets and/or internal gear reduction) may be employed to eliminate the need for any transmission. In this case, the input shaft of the motor would be coupled to a drive member that is driven by a pair of drive pins extending from one end of the gimbal frame so as to couple the drive member (and thus the motor) to one of the upper and lower gimbal frames.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the present invention in any way be limited by the above description, but instead be determined entirely by reference to the claims that follow.

The invention in which an exclusive right is claimed is defined by the following:

1. A joystick comprising:
   (a) a control handle adapted to enable a user to apply a force that pivotally displaces the control handle;
   (b) a control handle shaft extending from the control handle;
   (c) a multi-axis full gimbal assembly comprising:
      (i) a primary frame;
      (ii) an upper gimbal having an opening through which the control handle shaft extends, said upper gimbal being operatively coupled at opposing ends to said primary frame so as to be rotatable about a first axis and being pivotally coupled to said control handle shaft so as to enable rotation of said control handle shaft about a second axis, said first axis being orthogonal to said second axis; and
      (iii) a lower gimbal that is operatively coupled at opposing ends to said primary frame so as to be rotatable about the second axis and pivotally coupled to said control handle shaft so as to enable rotation of said control handle shaft about the first axis;
   (d) a first angular position sensor operatively coupled to the upper gimbal so as to sense a pivotal displacement of the control handle about the first axis;
   (e) a second angular position sensor operatively coupled to the lower gimbal so as to sense a pivotal displacement of the control handle about the second axis;
   (f) a first motor, operatively coupled to the upper gimbal and the primary frame so as to produce a torque acting on the control handle about the first axis in response to a first drive current; and
   (g) a second motor, operatively coupled to the lower gimbal and the primary frame so as to produce a torque on the control handle about the second axis in response to a second drive current.

2. The joystick of claim 1, further comprising:
   (a) a first transmission including an input member coupled to the first motor and an output member coupled to the upper gimbal; and
   (b) a second transmission including an input member coupled to the second motor and an output member coupled to the lower gimbal.

3. The joystick of claim 2, wherein:
   (a) the input member of the first transmission comprises a first pinion gear mounted on a shaft extending from and drivingly rotated by the first motor;
   (b) the output member of the first transmission comprises a first drive gear, said first transmission further including a first large gear in coaxial alignment with and coupled to a first small gear, said first pinion gear being in engagement with said first large gear and said first small gear being in engagement with said first drive gear;
   (c) the input member of the second transmission comprises a second pinion gear mounted on a shaft extending from and drivingly rotated by the second motor; and
   (d) the output member of the second transmission comprises a second drive gear, said second transmission further including a second large gear in coaxial alignment with and coupled to a second small gear, said second pinion gear being in engagement with said second large gear and said second small gear being in engagement with said second drive gear.

4. The joystick of claim 3, wherein the first drive gear comprises a first sector gear, and the second drive gear comprises a second sector gear.

5. The joystick of claim 2, wherein each of the upper and lower gimbals comprises a yoke-shaped frame having a pair of drive pins extending therefrom at a first end and having a shaft extending therefrom at a second end opposite the first end, said shaft being received by a bearing mounted to the primary frame, further comprising:
   (a) a first transmission bracket mounted to the primary frame to which the first motor is mounted and including a support shaft extending therefrom in coaxial alignment with said first axis upon which the output member of the first transmission is rotatably mounted, said first transmission bracket having a pair of clearance slots defined therein, said drive pins of the upper gimbal extending through different ones of the pair of clearance slots, said drive pins being received by corresponding receptacles defined in said output member of the first transmission such that said output member is coupled to said upper gimbal and said upper gimbal is rotatably supported at its first and second ends; and (b) a second transmission bracket mounted to the primary frame to which the second motor is mounted and including a support shaft extending therefrom in coaxial alignment with said second axis upon which the output member of the second transmission is rotatably mounted, said second transmission bracket having a pair of clearance slots defined therein, said drive pins of the lower gimbal extending through different ones of the pair of clearance slots in the second transmission bracket, said drive pins being received by corresponding receptacles defined in said output member of the second transmission such that said output member is coupled to said lower gimbal, and said lower gimbal is rotatably supported at its first and second ends.

6. The joystick of claim 5, wherein the output member of each of the first transmission comprises a first sector gear; said second transmission comprises a second sector gear; and wherein the first and second transmission brackets each include a pair of tabs extending therefrom that are configured to limit a clockwise and counterclockwise rotation of a respective one of the first and second sector gears.

7. The joystick of claim 1, wherein the first angular position sensor comprises a first potentiometer having an input shaft that is coupled to the upper gimbal so as to sense a rotation of the upper gimbal about the first axis, and the second angular position sensor comprises a second potentiometer having an input shaft that is coupled to the lower gimbal so as to sense a rotation of the lower gimbal about the second axis, output signals produced by the first and second potentiometers varying as a function of the rotation of the upper and lower gimbals, respectively.

8. The joystick of claim 1, wherein each of the lower and upper gimbals comprises a yoke-shaped frame, and wherein the control handle shaft has an upper part and a lower part that are coupled together, said upper part including a pair of support shafts extending in opposite directions therefrom generally aligned with said first axis and being received by respective bearings mounted on opposing sides of the yoke-shaped frame of the upper gimbal, said lower part of the control handle shaft including a pair of support shafts extending in opposite directions therefrom generally aligned with said second axis and being received by respective bearings mounted on opposing sides of the yoke-shaped frame of the lower gimbal.

9. The joystick of claim 1, wherein the upper gimbal and the lower gimbal are substantially identical.

10. The joystick of claim 1, wherein the control handle includes at least one input switch adapted to be actuated by a user and connected to at least one lead wire, and wherein said at least one lead wire extends through the control handle shaft.

11. The joystick of claim 1, wherein the control handle is rotatably mounted on the control handle shaft so as to be rotatable about a longitudinal axis of the control handle shaft, further comprising a third angular position sensor that senses the rotation of the control handle about the longitudinal axis of the control handle shaft.

12. The joystick of claim 11, wherein the control handle shaft is coupled with at least one of said upper and lower gimbals so as to prevent rotation of the control handle shaft about its longitudinal axis.

13. The joystick of claim 11, further comprising a spring operatively coupled to the control handle that produces a bias torque opposing rotation of the control handle about the longitudinal axis of the control handle shaft, away from a center position.

14. The joystick of claim 1, further comprising a motion controller connected to an energy source and providing the first and second drive currents to said first and second motors, respectively, in response to a haptic feedback control signal.

15. The joystick of claim 14, wherein the motion controller is linked in communication with a host computer on which a computer game is executing, said computer providing the haptic feedback control signal in response to the computer game so as to create a desired haptic feedback force that is applied to the control handle.

16. The joystick of claim 1, further comprising:

(a) a hemispherical member having a spherical surface coupled to the control handle shaft; and (b) a housing in which the multi-axis full gimbal assembly is disposed that includes an opening through which the control handle shaft extends having a bearing surface defined therein that is adapted to slidingly engage the spherical surface of the hemispherical member.

17. A joystick comprising:

(a) a control handle adapted to enable a user to apply an input force that displaces the control handle about at least one of a first axis and a second axis, said first and second axes being orthogonal to each other;

(b) a control handle shaft extending from the control handle, said control handle shaft including a first pair of support shafts extending in opposite directions therefrom along a common centerline aligned with the first axis, and a second pair of support shafts extending in opposite directions therefrom along a common centerline aligned with the second axis;

(c) a multi-axis full gimbal assembly comprising:

(i) a primary frame;

(ii) an upper gimbal comprising a first yoke-shaped frame having an opening through which the control handle shaft extends and including a first pair of bearings mounted on opposing sides thereof so as to receive said first pair of support shafts, said upper gimbal being operatively coupled at opposing ends to said primary frame so as to be rotatable about the second axis; and (iii) a lower gimbal comprising a second yoke-shaped frame including a second pair of bearings mounted on opposing sides thereof so as to receive said second pair of support shafts, said lower gimbal being operatively coupled at opposing ends to said primary frame so as to be rotatable about the first axis;

(d) a first angular position sensor operatively coupled to the lower gimbal so as to sense a pivotal displacement of the control handle about the first axis;

(e) a second angular position sensor operatively coupled to the upper gimbal so as to sense a pivotal displacement of the control handle about the second axis;

(f) a first motor, operatively coupled to the upper gimbal and the primary frame so as to produce a torque acting on the control handle to provide a haptic feedback force about the first axis in response to a first drive current; and (g) a second motor, operatively coupled to the lower gimbal and the primary frame, so as to produce a torque acting on the control handle to produce a haptic feedback about the second axis in response to a second drive current.

18. The joystick of claim 17, wherein the control handle shaft comprises an upper part and a lower part, said upper part including a saddle from which the first pair of support shafts extend and including a recess defined therein, the second pair of support shafts extending from the lower part, said lower part being received by the recess defined in the upper part so as to couple the lower and upper parts together.

19. The joystick of claim 17, wherein the control handle includes at least one input switch adapted to be actuated by a user and connected to at least one lead wire, said at least one lead wire extending through the control handle shaft.

20. The joystick of claim 17, wherein the control handle is rotatably mounted on the control handle shaft so as to be rotatable about a longitudinal axis of the control handle shaft, further comprising a third angular position sensor that senses the rotation of the control handle about said longitudinal axis.

21. The joystick of claim 20, wherein the control handle shaft is coupled with at least one of said upper and lower gimbals so as to prevent rotation of the control handle shaft about its longitudinal axis.

22. The joystick of claim 20, wherein the control handle is operatively coupled to a spring that produces a bias torque opposing rotation of the control handle about the longitudinal axis of the control handle shaft, away from a center position.

23. A joystick comprising:
  (a) a control handle that is pivotal about a plurality of axes in response to an input force applied to displace the control handle;
  (b) a control handle shaft depending from the control handle, said control handle being supported by the control handle shaft;
  (c) a multi-axis full gimbal assembly upon which the control handle shaft is pivotally mounted, comprising:
    (i) a primary frame;
    (ii) an upper gimbal pivotally coupled to said control handle shaft so as to enable rotation of said control handle shaft about a first axis and including a shaft extending from a first end of the upper gimbal that is received by a bearing coupled to said primary frame so as to be rotatable about a second axis that is orthogonal to said first axis, a pair of drive pins extending from a second end of the upper gimbal;
    (iii) a lower gimbal pivotally coupled to said control handle shaft so as to enable rotation of said control handle shaft about said second axis and including a shaft extending from a first end of the lower gimbal that is received by a bearing coupled to said primary frame so as to be rotatable about said first axis, a pair of drive pins extending from a second end of the lower gimbal;
    (iv) a first drive member operatively coupled to said primary frame so as to be rotatable about said second axis and having a pair of receptacles defined therein for receiving the drive pins of the upper gimbal such that said upper gimbal is drivingly coupled to said first drive member and is rotatably supported at its first and second ends; and
    (v) a second drive member operatively coupled to said primary frame so as to be rotatable about said first axis and having a pair of receptacles defined therein for receiving the drive pins of the lower gimbal such that said lower gimbal is drivingly coupled to said second drive member and is rotatably supported at its first and second ends;
  (d) a first angular position sensor operatively coupled to the upper gimbal so as to sense a pivotal displacement of the control handle about the second axis;
  (e) a second angular position sensor operatively coupled to the lower gimbal so as to sense a pivotal displacement of the control handle about the first axis;
  (f) a first motor, operatively coupled to the first drive member and the primary frame so as to produce a torque acting on the control handle about the second axis; and
  (g) a second motor, operatively coupled to the second drive member and the primary frame so as to produce a torque acting on the control handle about the first axis.

24. The joystick of claim 23, further comprising:
  (a) a first transmission bracket mounted to the primary frame and supporting the first motor, said first transmission bracket including a first support shaft extending therefrom in alignment with said second axis, said first drive member being rotatably mounted on said first support shaft, said first transmission bracket having a pair of clearance slots defined therein through which the drive pins of the upper gimbal extend; and
  (b) a second transmission bracket mounted to the primary frame and supporting the second motor, said second transmission bracket including a first support shaft extending therefrom in alignment with said first axis, said second drive member being rotatably mounted on said second support shaft, said second transmission bracket having a pair of clearance slots defined therein through which the drive pins of the lower gimbal extend.

25. The joystick of claim 23, further comprising:
  (a) a first transmission including an input member coupled to the first motor and an output member comprising said first drive member; and
  (b) a second transmission including an input member coupled to the second motor and an output member comprising said second drive member.

26. The joystick of claim 25, wherein the input member of the first transmission comprises a first pinion gear mounted on a shaft extending from and rotated by the first motor, said first drive member comprising a first drive gear, said first transmission further including a first combination gear rotatably mounted on a second support shaft extending from said first transmission bracket and comprising a first large gear in coaxial alignment with and coupled to a first small gear, said pinion gear engaging said first large gear, and said first small gear engaging said first drive gear; and wherein the input member of the second transmission comprises a second pinion gear mounted on a shaft extending from and rotated by the second motor, said second drive member comprising a second drive gear, said second transmission further including a second combination gear rotatably mounted on a second support shaft extending from said second transmission bracket and comprising a second large gear in coaxial alignment with and coupled to a second small gear, said second pinion gear engaging said second large gear and said second small gear engaging said second drive gear.

27. The joystick of claim 26, wherein each of the first and second drive gears comprises a corresponding sector gear.

28. The joystick of claim 27, wherein each of the first and second transmission brackets includes a pair of tabs extending therefrom that are configured to limit a clockwise and counterclockwise rotation of a different one of the sector gears.

* * * * *